United States Patent
Nomura

(10) Patent No.: US 6,681,996 B2
(45) Date of Patent: Jan. 27, 2004

(54) PASSBOOK PRINTER, PASSBOOK PRINTER MAINTENANCE METHOD, DATA PROCESSOR, DATA PROCESSOR MAINTENANCE METHOD, AND STORAGE MEDIUM FOR PRINTER OPERATION CONTROL DATA

(75) Inventor: Yukihiro Nomura, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 09/767,531

(22) Filed: Jan. 23, 2001

(65) Prior Publication Data

US 2001/0010336 A1 Aug. 2, 2001

(30) Foreign Application Priority Data

Jan. 31, 2000 (JP) ........................................ 2000-023141

(51) Int. Cl.[7] .............................................. G06K 19/06
(52) U.S. Cl. ........................ 235/493; 235/375; 235/379; 235/380; 235/382; 235/449; 902/8
(58) Field of Search ................................ 235/493, 375, 235/379, 380, 382, 449; 902/8

(56) References Cited

U.S. PATENT DOCUMENTS

| 4,983,053 | A | * | 1/1991 | Tsukui | 400/62 |
|---|---|---|---|---|---|
| 5,142,129 | A | * | 8/1992 | Nakamura et al. | 235/379 |
| 5,185,515 | A | * | 2/1993 | Nishibe | 235/379 |
| 5,623,552 | A | * | 4/1997 | Lane | 382/124 |
| 5,949,058 | A | * | 9/1999 | Kimura | 235/486 |
| 6,196,465 | B1 | * | 3/2001 | Awano | 235/487 |
| 6,400,384 | B1 | * | 6/2002 | Kuwabara | 347/129 |
| 6,595,428 | B2 | * | 7/2003 | Eguchi et al. | 235/493 |

* cited by examiner

Primary Examiner—Michael G. Lee
Assistant Examiner—Seung H Lee
(74) Attorney, Agent, or Firm—Louis P. Herzberg

(57) ABSTRACT

The configuration of this passport printer reduces the burden of reentering adjusting and setting values of passbook printers. When a control card 3 is replaced by another card, the adjusting and setting values of a passbook printer 1 stored in a nonvolatile memory attached in the control card 3 are written in a separately prepared magnetic stripe by using a magnetic head 41. Then, after the replacement of the control card 3, the adjusting and setting values written in the magnetic stripe are read by using the magnetic head 41, and stored in the nonvolatile memory of a control card 3 as a new replacement.

18 Claims, 8 Drawing Sheets

FIG. 3

Printer ID = 1B
SETUP = ALARM, NO_ZERO_SLASH, NO_AUTOLF, CHAR2, NO_AUTOCR
FEATURE = NONE
COMMUNICATION = SERIAL WITH FINANCE DEVICE DRIVER
BAUD RATE = 9600
COUNTRY/CODE PAGE = CP437
PRINT SPEED = NORMAL
FUNCTION DEFINITION = 80 70 60 50 40 30 20 10
ACCEPTABLE SKEW = 0006
PB LENGTH = 02CE
MICROCODE = VER 06 REL 01 PATCH LEVEL 0002
ADJUST VALUE = TOP MARGIN 01 LEFT MARGIN 0A BOTTOM MARGIN 38 TOP EDGE FE ALIGN SENSOR 00 FEED ADJUST 09 REMS POS 00

FIG. 4

BAUD RATE                                              TOP MARGIN
1B 12 00 01 96 00 04 37 00 47 22 80 70 60 50 40 30 20 10 00 06 06 01 00 02 01 0A 38 FE 00 09 00

PASSBOOK PRINTER, PASSBOOK PRINTER MAINTENANCE METHOD, DATA PROCESSOR, DATA PROCESSOR MAINTENANCE METHOD, AND STORAGE MEDIUM FOR PRINTER OPERATION CONTROL DATA

FIELD OF THE INVENTION

The present invention relates to a passbook printer, and more particularly to a passbook printer installed at a financial institution and a maintenance method thereof.

BACKGROUND OF THE INVENTION

When a passbook is inserted into a passbook printer for printing data regarding deposits and savings at a financial institution, in general, the printer operates as follows:

1) a magnetic stripe reading/writing unit reads user account data written in a magnetic stripe provided as a magnetic recording medium stuck to the backside of the passbook;
2) the result of reading is transferred to a host computer;
3) printing is carried out on a specified place of the passbook according to a printing command transferred from the host computer; and
4) data on the magnetic stripe is updated by the reading/writing unit, and then the passbook is ejected.

There are adjusting and setting values, e.g., a printer mechanism adjusting value, a communication speed setting value and so on, which need to be set for each individual printer. Usually, such adjusting and setting values are stored in a nonvolatile memory (NVRAM) mounted on a control board provided to control a printing speed of the printer, and then the printer is shipped. The passbook printer installed at the financial institution executes a printing operation based on the adjusting and setting values stored in the nonvolatile memory.

The control board having the nonvolatile memory mounted thereon needs to be replaced by a new one when it gets out of order. Conventionally, such replacement of the control board has been carried out by entry of setting and adjusting values in the nonvolatile memory mounted on the new control board.

This adjusting value setting operation has occupied a considerable period of time in the overall control board replacing work.

Therefore, it is object of the present invention to provide a passbook printer capable of reducing the burden of reentering adjusting and setting values thereof, and a maintenance method of the passbook printer.

SUMMARY OF THE INVENTION

In accordance with the present invention, a reading/writing unit provided in the passbook printer is utilized to enter the adjusting and setting values.

Specifically, as described above, the passbook printer is provided with a unit for reading/writing data in a magnetic stripe stuck to a passbook. When a control board is replaced, the adjusting and setting values (in this specification, the expression of operation control data is used as a concept including the both) of the passbook printer stored in a memory are written in a separately prepared magnetic stripe by using the reading/writing unit. Then, the operation control data written in the magnetic stripe after the replacement of the control board is read by using the reading/writing unit, and stored in the memory of a new replacement control board.

Therefore, the present invention provides a passbook printer for performing printing on a passbook having a beltlike magnetic recording layer provided therein. In this case, the passbook printer comprises: a memory for storing operation control data used to control an operation of the passbook printer; a magnetic head for executing reading of data from, alternatively writing of data in the beltlike magnetic recording layer provided in the passbook; and a control unit for instructing the magnetic head to read the operation control data from a saving magnetic recording medium when the saving magnetic recording medium storing the operation control unit is received from an external unit, and to store the read the operation control data in the memory.

According to the passbook printer of the present invention, by making use of the magnetic head originally provided in the passbook printer, the operation control data of the passbook printer can be stored temporarily in an external magnetic storage medium, i.e., in the saving magnetic recording medium. After the replacement of the control board, the operation control data stored in the saving magnetic recording medium can be read by the magnetic head, and stored in the memory on a replaced control board. Accordingly, it is possible to reduce the burden of complex work placed on a maintenance engineer to enter the operation control data all over again after the replacement of the control board like that in the conventional case.

No particular limitation is placed on the shape of the saving magnetic recording medium of the present invention, and the magnetic stripe stuck to the passbook can be used for such a purpose. In practice, however, since the magnetic stripe by itself cannot be used for the passbook printer, it is desired to use the magnetic stripe in combination with a holder. Accordingly, the present invention provides an operation control data storage medium consisting of a magnetic stripe for storing the operation control data of the printer and a holder for holding the magnetic stripe.

The operation control data of the passbook printer may be changed after its installation at a financial institution. Thus, the passbook printer of the present invention should preferably be provided with operation control data change displaying means for displaying the change of the operation control data from initial setting.

In the passbook printer of the present invention, the control unit should preferably make determination as to whether the operation control data stored in the memory has already been stored in the saving magnetic recording medium provided from the external unit.

The present invention also provides a passbook printer for performing printing on a passbook having a beltlike magnetic recording layer provided therein. In this case, the passbook printer comprises: a magnetic head for executing reading of data from, alternatively writing of data in the beltlike magnetic recording layer; a memory for storing operation control data used to control an operation of the passbook printer; and a control unit for instructing the magnetic head to write the operation control data stored in the memory in a saving magnetic recording medium received from an external unit.

According to the described passbook printer, the operation control data stored in the memory can be written in the saving magnetic recording medium as an externally provided magnetic recording medium before the replacement of the control board. Accordingly, it is possible to store the operation control data in a new replacement memory by using the saving magnetic recording medium after the replacement of the control board.

In the passbook printer of the present invention, it is desired that the control unit makes determination as to whether the operation control data stored in the memory has been changed from initial setting or not, and when determining a change, the control unit instructs writing of the operation control data stored in the memory in the saving magnetic recording medium provided from the external unit.

The saving magnetic recording medium of the present invention is received by the passbook printer as in the case of the passbook. Accordingly, the writing of the operation control data in the saving magnetic recording medium is performed while the saving magnetic recording medium is arranged in a position for executing reading/writing of the data on the passbook.

The foregoing passbook printer of the present invention uses a magnetic recording system as a precondition, but the present invention is not limited to such a recording system. The present invention can be applied as long as the printer includes a unit for reading or writing data from/in a data recording medium provided in a printed matter as a medium for printing. Then, according to the present invention, by using the reading/writing unit, control data regarding the operation of the printer can be read or written from/in the data storage medium outside the printer.

Therefore, in the present invention, a printer is provided for printing a specified item on a predetermined place of a printed matter having an data storage portion. In this case, the printer comprises: a memory for storing control data regarding an operation of the printer; a reading/writing unit for executing reading/writing of data in the data storage portion of the printed matter; control data writing instructing means for instructing the reading/writing unit to write the control data stored in the memory in a saving external storage medium received by the printer from an external unit; and control data reading instructing means for instructing the reading/writing unit to read the control data, and to store the same in a replacement memory after the printer receives the saving external storage medium storing the control data, if the memory is replaced by a different replacement memory.

The present invention can be applied to an data processor other than the printer. In the present invention, an data processor is provided for reading/writing data in an data storage medium having an data storage portion. In this case, the data processor comprises: a memory for storing control data regarding an operation of the data processor; a reading/writing unit for executing reading/writing of data in the data storage portion of the data storage medium; control data writing instructing means for instructing the reading/writing unit to write the control data stored in the memory in a saving data storage medium received by the data processor from an external unit; and control data reading instructing means for instructing the reading/writing unit to read the control data and to store the same in the memory when the data processor receives the saving data storage medium storing the control data from the external unit, in the case where the control data written in the saving data storage medium is reproduced. For example, in the case of applying the present invention to an data processor such as POS or the like, control data can be printed as a bar code, and read by a bar code reader. In the case of applying the present invention to an OCR device, control data can be printed on a saving sheet as a character or a symbol, and read by the OCR device. Further, in the case of applying the invention to a magnetic card or an IC card processor, control data can be written in a saving card.

Operation control data is set for each passbook printer when the printer is shipped by a passbook printer manufacturer. Thus, at the time of passbook printer shipping, the operation control data can be stored in the magnetic stripe of the foregoing external data storage medium. This external data storage medium is stored such that its correspondence to the passbook printer can be identified. Then, the operation control data can be stored in the memory of a new control board provided at the time of the replacement of the control board of the passbook printer by using the external data storage medium.

Therefore, the present invention provides a maintenance method of a passbook printer. In this case, the passbook printer is provided with a memory for storing printer operation control data used to control an operation of the printer, and a reading/writing unit for reading/writing data in an data storage medium provided in a passbook. The maintenance method of the passbook printer comprises: a memory installing step of replacing the memory to install a new memory; and a printer operation control data storing step of causing the reading/writing unit to read the printer operation control data from an external data storage medium storing the printer operation control data, and to store the read printer operation control data in the new memory.

The operation control data may be changed from initial data after the installation of the passbook printer at a financial institution. In such a case, the operation control data set at the time of passbook printer shipping cannot be used. Therefore, in the maintenance method of the passbook printer of the present invention, it is important to confirm that the printer operation control data has not been changed from the initial printer operation control data, before the execution of the storing means installing step. If it is confirmed that the printer operation control data has not been changed from the initial data, then, in the printer control data storing step, the printer operation control data is read from an external data storage medium previously storing the initial printer operation control data. On the other hand, if it is confirmed that the printer operation control data has been changed from the initial data, then, after the execution of the printer operation control data confirming step, a printer operation control data writing step of writing the printer operation control data stored in the storing means in the external data storage medium is executed and, in the printer operation control data storing step, the printer operation control data is read from the external data storage medium having the printer operation control data written therein in the printer operation control data writing step.

On the assumption that the printer operation control data has been changed from the initial data, the present invention provides a maintenance method of an data processor. In this case, the data processor is provided with a control board for controlling an operation of the data processor, and a reading/writing unit for reading/writing data in an data storage medium. The maintenance method comprises: a control data writing step regarding an operation of the data processor, provided to write operation control data of the data processor stored on the control board in an external data storage medium by the reading/writing unit; a control board installing step of replacing the control board to install a new control board; and a control data storing step regarding an operation of the data processor, provided to read the control data of the data processor operation written in the external data storage medium by the reading/writing unit, and store the read control data of an operation of the data processor on the new control board.

The processing of writing the printer operation control data stored on the control board in the external data storage medium can be carried out at an optional time after the installation of the passbook printer at a financial institution. In other words, the control data writing step may not necessarily accompany the maintenance work for replacing the control board. Therefore, the present invention provides a maintenance method of an data processor. In this case, the data processor is provided with a control board for controlling an operation of the data processor, and a reading/writing unit for reading/writing data in an data storage medium. The maintenance method comprises: a step of making confirmation as to whether control data of an data processor operation stored on the control board has been updated; and a control data writing step regarding an operation of the data processor, provided to write the updated control data of the data processor operation in an external data storage medium by the reading/writing unit, if it is confirmed that the control data of the data processor operation has been updated.

BRIEF DESCRIPTION OF THE DRAWINGS

For a more complete understanding of the present invention and the advantages thereof, reference is now made to the following description taken in conjunction with the accompanying drawings.

FIG. 3 is a view showing an example of adjusting and setting values of the passbook printer of the embodiment.

FIG. 4 is a view showing an example of data regarding hexadecimal conversion of the adjusting and setting values of FIG. 3.

DETAILED DESCRIPTION OF THE PREFERRED EMBODIMENTS

Next, description will be made for the preferred embodiment of the present invention.

Figure 1:
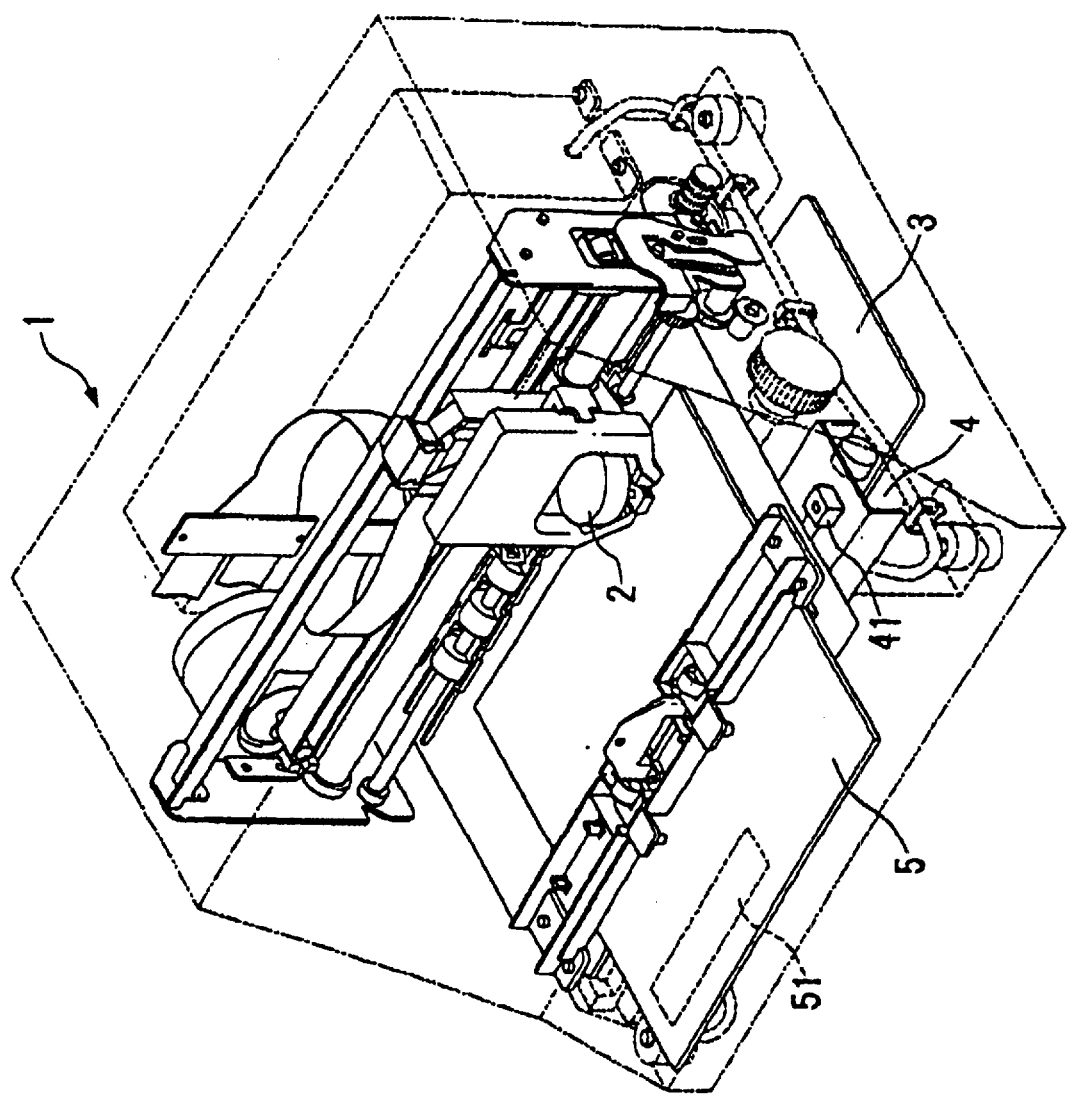
FIG. 1 is a constitutional view schematically showing a passbook printer of the embodiment of the invention.

FIG. 1 schematically shows a constitution of a passbook printer 1 according to the embodiment.

The passbook printer 1 comprises the following main components: a printer head 2 as a printing portion; a control card 3 as a control board; and a magnetic reading/writing unit 4 including a magnetic head 41. The printer head 2 and the magnetic reading/writing unit 4 can be reciprocated in the width direction of the passbook printer 1 by a driving source. Note that FIG. 1 specifically shows the inserted state of a passbook 5 having magnetic stripe 51 as a beltlike magnetic recording layer stuck to the backside thereof.

Figure 2:
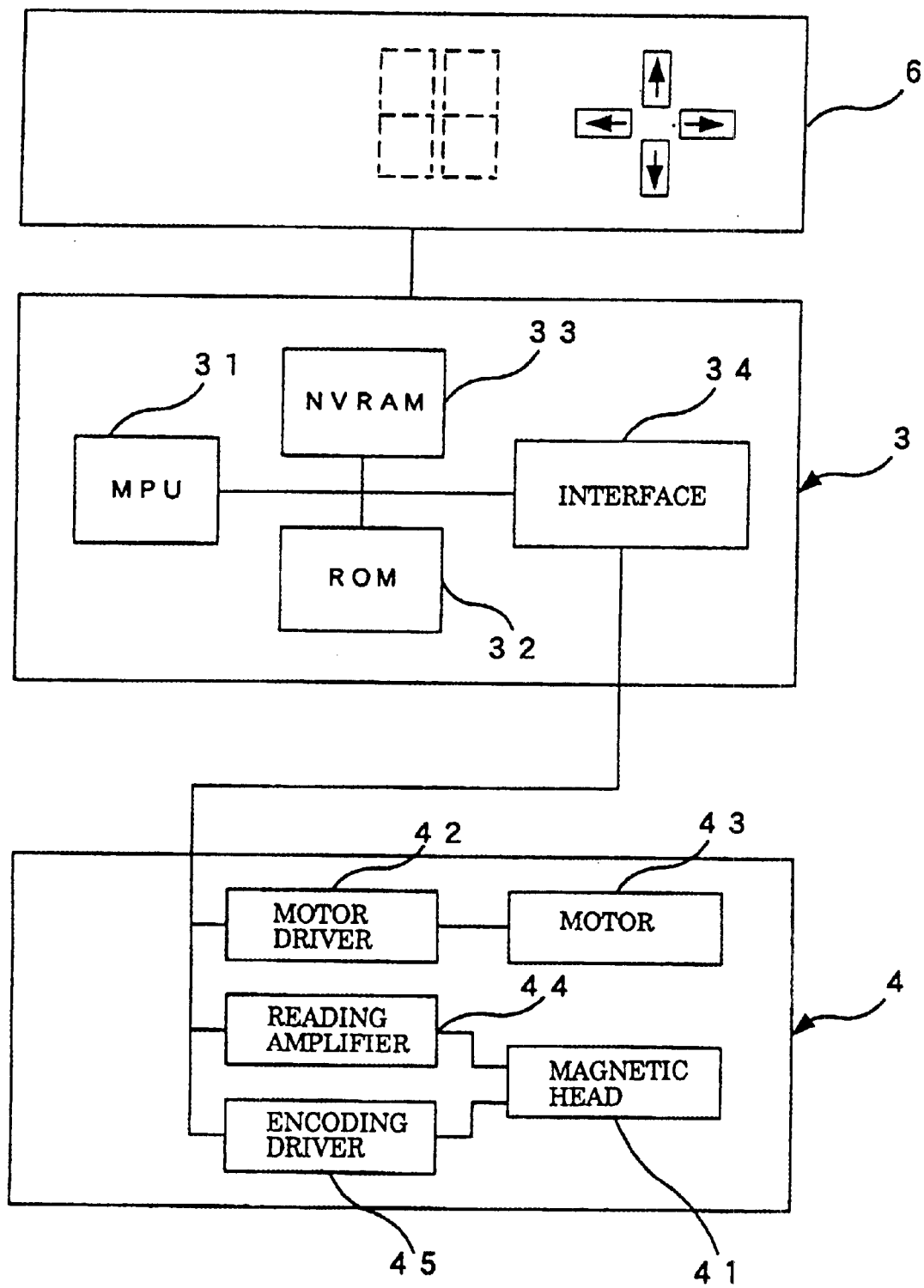
FIG. 2 is a block diagram showing main functions of the passbook printer of the embodiment.

FIG. 2 shows a constitution of the control card 3 and the magnetic reading/writing unit 4.

The control card 3 includes an MPU (Micro Processing Unit) 31, a ROM (Read Only Memory) 32, an NVRAM (Nonvolatile Random Access Memory) 33 and an interface 34.

The ROM 32 stores various control codes for controlling the operation of the passbook printer 1, and these control codes are interpreted and executed by the MPU 31.

The NVRAM 33 stores an adjusting value for controlling the printing operation, such as a top margin, a left margin or the like, of the passbook printer 1. This adjusting value is stored in the manufacturing stage of the passbook printer 1. Thereafter, however, in some cases, the adjusting value may be adjusted after printer installation at a financial institution, and changed from an initial value. In other words, the adjusting value may be maintained at the initial value of the manufacturing stage, or changed from the initial value. The passbook printer 1 also has a setting value regarding a communication speed, a printing speed or the like, and this setting value is stored in the NVRAM 33. As in the case of the adjusting value, the setting value may be maintained at its initial value of the manufacturing stage or changed from the initial value. Both of the adjusting and setting values may be referred to as operation control data.

The magnetic reading/writing unit 4 includes, in addition to the magnetic head 41, a motor driver 42, a motor 43, a reading amplifier 44 and an encoding driver 45.

During data writing and reading, the magnetic reading/writing unit 4 is operated as follows. During writing, data transferred through the interface 34 is sent to the encoding driver 45, and a specified writing current is generated on the magnetic head 41 by the encoding driver 45. Simultaneously, by traveling the magnetic head 41 on the magnetic stripe 51 of the passbook 5 in accordance with the movement of the motor 43 driven by the motor driver 42, the transferred data is written in the magnetic stripe 51. During reading, the magnetic head 41 is traveled on the magnetic stripe 51 of the passbook 5 in accordance with the movement of the motor 43 driven by the motor driver 42. A change of current generated in the magnetic head 41 in this process is detected by the reading amplifier 44, and transferred to the interface 34.

A reference numeral 6 in FIG. 2 denotes an operation panel. Commands regarding various operations of the passbook printer 1 are expressed by 2-digit numerals. Each command can be executed by using the operation panel 6 to enter a 2-digit numerals. The operation panel 6 includes a function as display means, and can represent the operation mode or the like of the passbook printer 1 by 2-digit numerals.

A general operation of the passbook printer 1 is as follows:

1) when the passbook 5 having the magnetic stripe 51 stuck thereto is inserted, user account data as a self-other identification data written in the magnetic stripe 51 is read by the magnetic head 41 of the magnetic reading/writing unit 4;

2) the read data is transmitted to a host computer (not shown);

3) in accordance with a printing command outputted from the host computer as a result, a specified item is printed on predetermined place of the passbook; and 4) the data of the magnetic stripe 51 of the passbook 5 is updated by the magnetic head 41 of the magnetic reading/writing unit 4, and then the passbook 5 is ejected.

In the passbook printer 1 operated in the foregoing manner, when the control card 3 fails, the card 3 is replaced by another card. Accordingly, the NVRAM 33 storing the adjusting and setting values of the passbook printer 1 is also replaced to become a replaced memory. After the replacement of the control card 3, in order to obtain a printing operation similar to that before the replacement, it is necessary to store the adjusting and setting values in the replaced new NVRAM 33, the values having been stored in the NVRAM 33 before the replacement.

FIG. 3 shows an example of various adjusting and setting values. In FIG. 3, Printer ID to MICROCODE are setting values, and ADJUST VALUE is an adjusting value. The setting values include the foregoing ID (Printer ID), on/off of an optional mechanism (SETUP), a communication type (COMMUNICATION), a communication speed (BAUD RATE) and a printing speed (PRINT SPEED). As adjusting values, a top margin (TOP MARGIN) and a left margin (LEFT MARGIN) are included.

In accordance with the embodiment, such adjusting and setting values are previously written in a separately prepared magnetic stripe by utilizing the magnetic head 41 of the magnetic reading/writing unit 4 before the replacement of the control card 3 included in the passbook printer 1. Then, after the replacement of the control card 3, the adjusting and setting values are read from the magnetic stripe by using the magnetic head 4 of the magnetic reading/writing unit 4, and stored in a new NVRAM 33.

The separately prepared magnetic stripe can be stuck to the surface of a document, or stuck to an adjustment passbook usually prepared for maintenance work. In other words, the document having the magnetic stripe or the adjustment passbook having the magnetic stripe is used as an external magnetic recording medium, and the adjusting and setting values of the passbook printer 1 are stored in this magnetic recording medium.

The adjusting and setting values of FIG. 3 can be converted into hexadecimal codes like those shown in FIG. 4. A format is decided beforehand in a manner that '96 00' of 5th or 6th byte denotes a communication speed (BAUD RATE), '01' of 26th byte denotes a top margin (TOP MARGIN), and so on.

Figure 5:
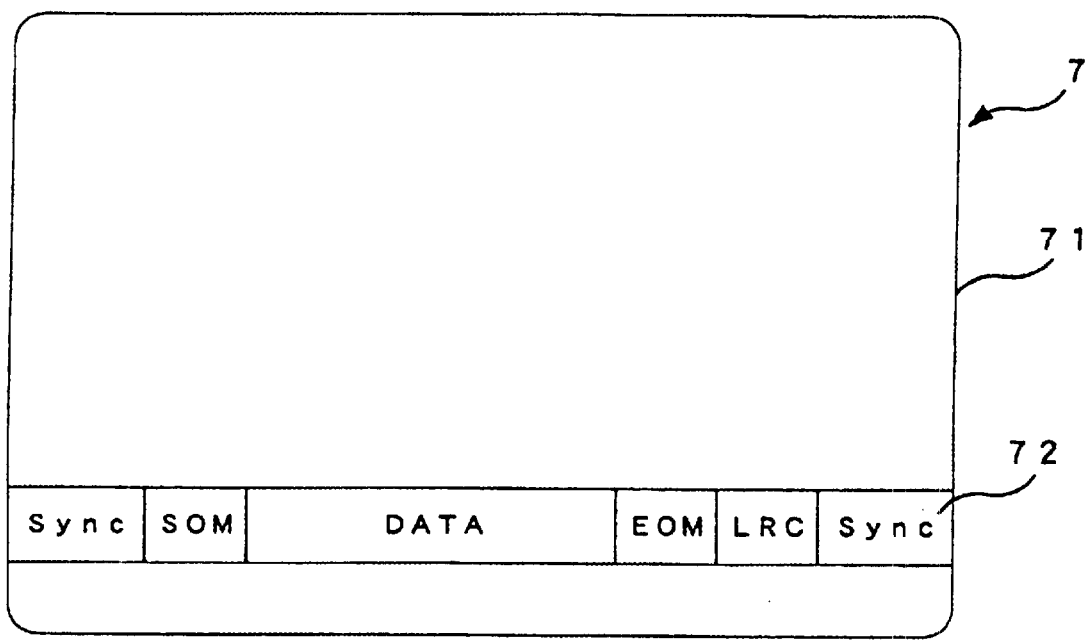
FIG. 5 is a view showing an adjusting value storage card 7 having a magnetic stripe 72 of the embodiment stuck thereto.

FIG. 5 shows an adjusting value storage card 7 with the magnetic stripe 72 stuck to the surface of a document 71 having a predetermined strength and provided as a holder. If the magnetic stripe 72 is compatible to ISO 7811 Track 2 System, then a hexadecimal 1 digit (4 bits) denotes one character, a parity bit is added to each character, and the character can be written in the DATA portion of the magnetic stripe 72 of FIG. 5. Note that SYNC, SOM, EOM and LRC of the magnetic stripe 72 are control codes defined by ISO 7811.

Data writing based on the foregoing format is carried out as follows. First, the MPU 31 of the control card 3 reads the adjusting and setting values stored in the NVRAM 33, and arranges these values in a character string according to the format. Then, through the interface 34, data regarding this character string is transferred to the encoding driver 45 of the magnetic reading/writing unit 4. In the magnetic head 41, a specified writing current is generated by the encoding driver 45. The magnetic head 41 travels on the magnetic stripe 72 of the adjusting value storage card 7 according to the movement of the motor 43 driven by the motor driver 42, and the adjusting and setting values converted into hexadecimal codes, by means of the writing current, are written in the DATA portion. The adjusting value storage card 7 as a saving magnetic recording medium is received by the passbook printer 1 as in the case of the passbook 5 received by the passbook printer 1. In other words, the writing of the adjusting and setting values in the adjusting value storage card 7 is performed by disposing the card 7 in the position of reading/writing data from/into the passbook 5.

On the other hand, the reading of data regarding the adjusting and setting values written in the magnetic stripe 72 of the adjusting value storage card 7 is carried out as follows. For this operation, it is assumed that the data converted into the hexadecimal codes of the adjusting and setting values have been written in the DATA portion of the magnetic stripe 72 according to the foregoing format. The magnetic head 41 travels on the magnetic stripe 72 of the adjusting value storage card 7 according to the movement of the motor 43 driven by the motor driver 42. A change of current generated in the magnetic head 41 in this process is detected by the reading amplifier 44, and transferred through the interface 34 to the MPU 31 of the control card 3. The MPU 31 analyzes the transferred hexadecimal data, and determines what adjusting value or setting value each number means by grasping which position each number is located. After this determination, the MPU 31 stores the data regarding the adjusting and setting values in predetermined addresses of the NVRAM 33.

Before the writing in the magnetic stripe 72, the reading of data from the magnetic stripe 72 and the storage thereof in the NVRAM 33, the passbook printer 1 must be set at the corresponding modes. The control code of each mode is stored beforehand in the ROM 32 of the control card 3. In other words, control codes for executing the mode of the writing in the magnetic stripe 72 (referred to as download, hereinafter), and the modes of the data reading from the magnetic stripe 72 and the storage in the NVRAM 33 (referred to as upload, hereinafter) are stored beforehand, and means is included for selecting any of these modes.

Such mode selection can be executed by the operation panel 6 provided in the passbook printer 1. For example, a command for executing the download mode is set as 30, and a command for executing the upload mode is set as 31. Then, the command 30 is entered by the operation panel 6 and, when the document 71 having the magnetic stripe 72 stuck thereto is inserted into the passbook printer 1, downloading is executed. The command 31 is entered by the operation panel 6 and, when the document 71 having the magnetic stripe 72 stuck thereto is inserted into the passbook printer 1, uploading is executed.

The operation of the mode selection is not limited to the execution from the operation panel 6, but the magnetic stripe 72 of the adjusting value storage card 7 can also be used. Specifically, a command for executing downloading/uploading is stored beforehand on the magnetic stripe 72. When the adjusting value storage card 7 is inserted into the passbook printer 1, data regarding the stored command may be read by the magnetic head 41 of the magnetic reading/writing unit 4, and then interpreted and executed by the MPU 31.

In this case, the adjusting value storage card 7 for downloading and the adjusting value storage card 7 for uploading must be separated from each other. In other words, in the adjusting value storage card 7 having no data stored in the DATA portion initially, the command for executing the download mode is stored. On the other hand, in the adjusting value storage card 7 having the hexadecimal codes of data regarding the adjusting and setting values stored in the DATA portion, the command for executing the upload mode is stored.

Regarding the adjusting and setting values, initial values thereof are stored in the NVRAM 33 at the time of shipping from the factory. The passbook printer 1 may be continuously used with the adjusting and setting values maintained at their initial values even after the installation at the financial institution. In some cases, however, the adjusting and setting values may be changed after the installation at the financial institution. Accordingly, depending on whether the adjusting and setting values are maintained at the initial values or not, the replacement of the control card 3, i.e., work during the maintenance of the passbook printer 1, may be different.

Specifically, if the adjusting and setting values are maintained at the initial values, then the downloading described in the embodiment is not necessary, and only the uploading needs to be executed. If the adjusting and setting values are changed from the initial values, then the uploading needs to be executed after the execution of the downloading. Even when there are changes in the adjusting and setting values from the initial values, if the adjusting and setting values after changes are stored beforehand in the adjusting value storage card 7, then only the uploading needs to be carried out during the replacement of the control card 3.

Figure 7:
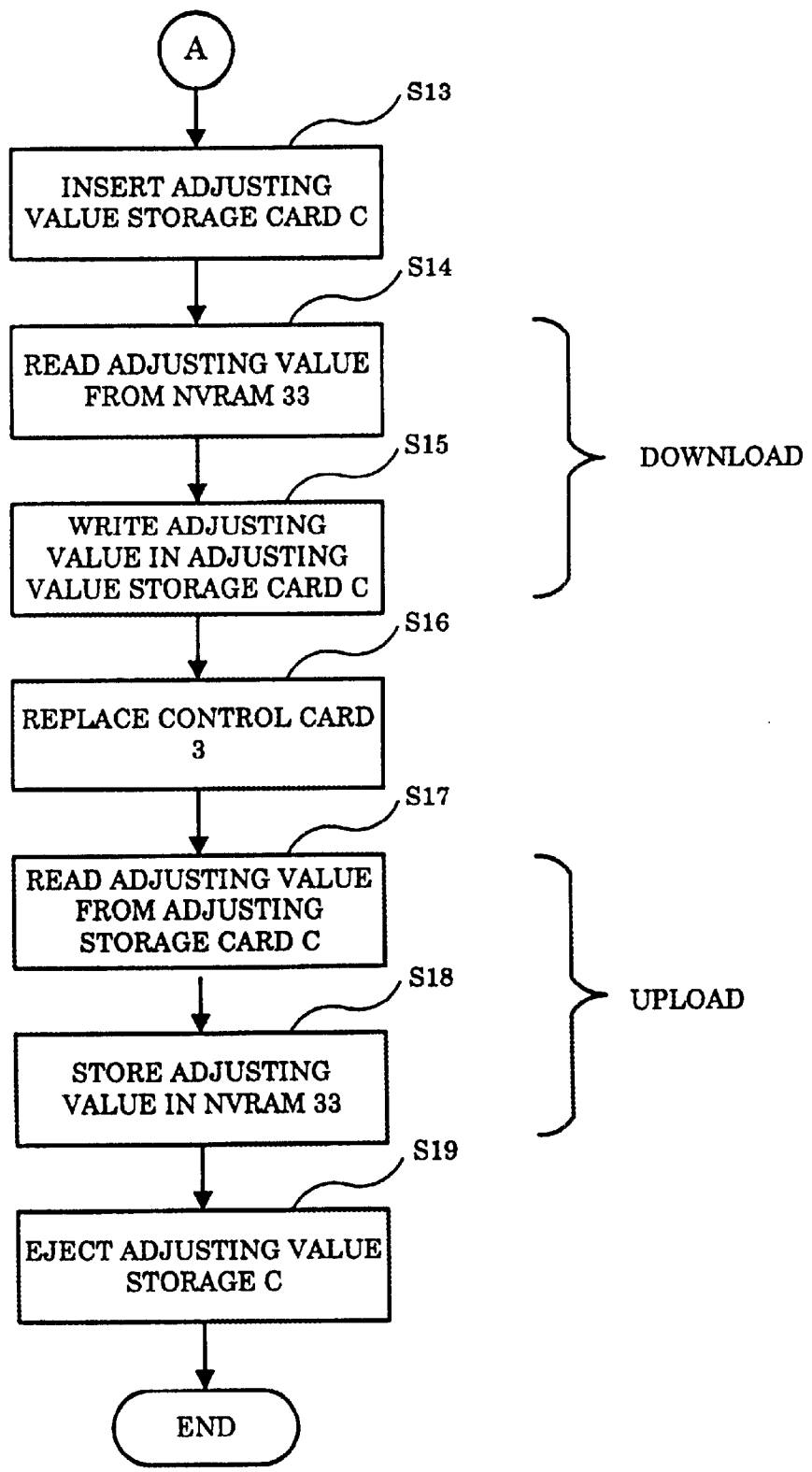
FIG. 7 is a chart showing a maintenance flow of the passbook printer of the embodiment.

Next, description will be made for a maintenance method of the passbook printer 1 based on the foregoing consideration with reference to a flow chart shown in FIG. 7.

Figure 6:
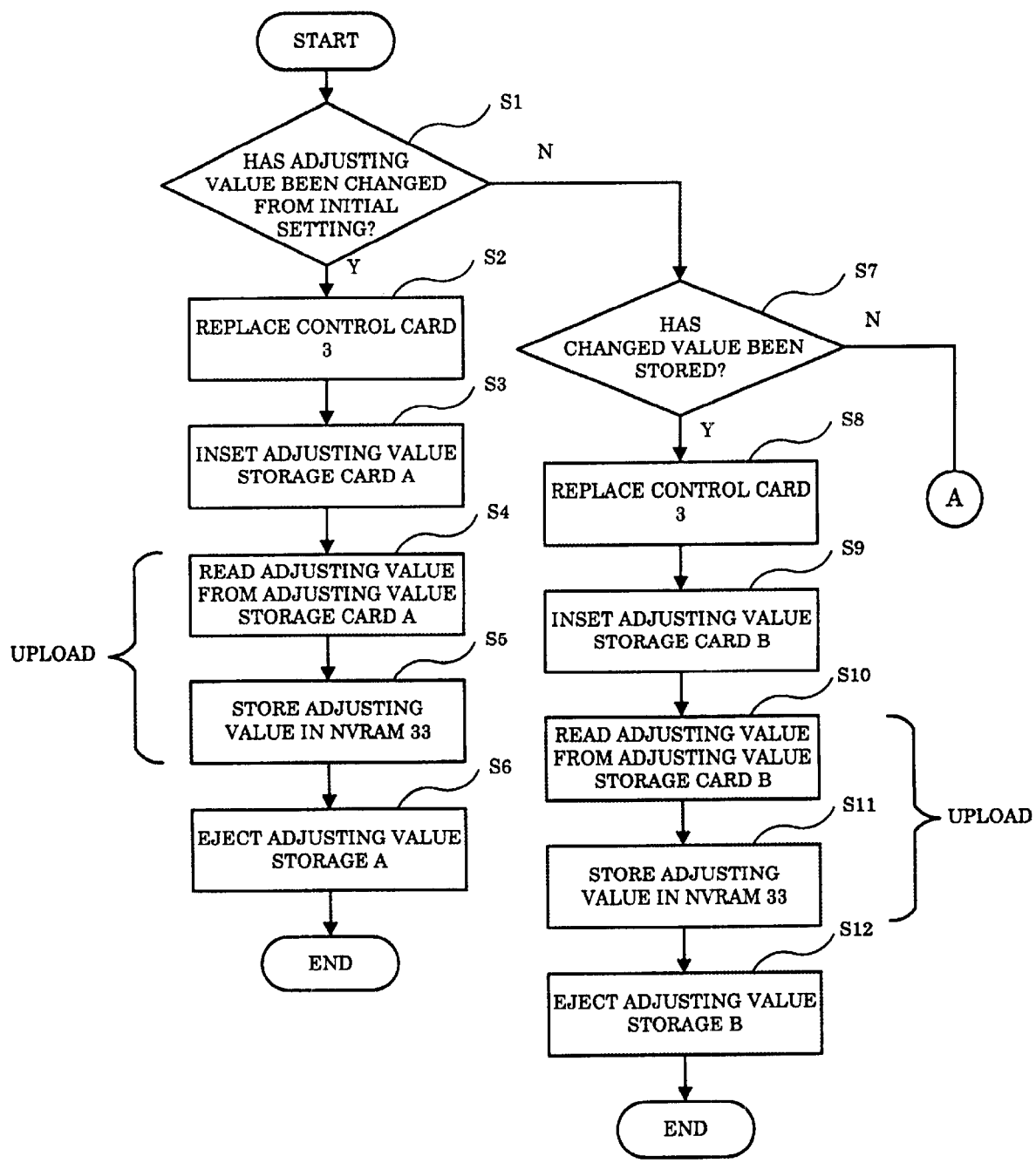
FIG. 6 is a chart showing a maintenance flow of the passbook printer of the embodiment.

First, determination is made as to whether the adjusting and setting values are maintained at initial values without any changes or not (S1 in the drawing). If they keep the initial values, the control card 3 is replaced (S2). In FIGS. 6 and 7, an adjusting value is used representing both of the adjusting and setting values.

After the control card 3 has been replaced, an adjusting value storage card A is inserted into the passbook printer 1 (S3). The adjusting value storage card A includes adjusting and setting values stored in its magnetic stripe 72 by keeping the initial values thereof. This adjusting value storage card A can be made when the passbook printer 1 is shipped from the factory.

When the adjusting value storage card A is inserted into the passbook printer 1, it is carried to a predetermined position by a carrier as in the case of the passbook 5, and then the adjusting and setting values are read from the adjusting value storage card A by the magnetic head 41 of the magnetic reading/writing unit 4 (S4). The predetermined position is a position for executing data reading/writing from/into the magnetic stripe 51 of the passbook 5.

The read adjusting and setting values are stored in the specified register of the NVRAM 33 by the MPU 31 as described above (S5).

After the storage of the adjusting and setting values in the NVRAM 33, the adjusting value storage card A is ejected out of the passbook printer 1 (S6), completing a series of maintenance operations.

If it is determined in S1 that changes have been made in the adjusting and setting values from the initial values, then confirmation is made as to whether the changed adjusting and setting values have already been stored in the adjusting value storage card or not (S7). If the adjusting and setting values have been changed from the initial values for a plurality of times, all the changed adjusting and setting values are considered to be the above changed adjusting and setting values.

If it is determined that the changed adjusting and setting values have already been stored in the adjusting value storage card, then uploading is carried out by using the adjusting value storage card (referred to as an adjusting value storage card B). Then, as required by a precondition, the control card 3 is replaced (S8).

After the replacement of the control card 3, the adjusting value storage card B is inserted into the passbook printer 1 (S9). The adjusting value storage card B is different from the adjusting value storage card A used in a series of operations from S2 to S6 in that the changed adjusting and setting values are stored in the magnetic stripe 72 thereof.

After the insertion of the adjusting value storage card B into the passbook printer 1, the magnetic head 41 of the magnetic reading/writing unit 4 reads the adjusting and setting values from the adjusting value storage card B (S10).

The read adjusting and setting values are, as described above, stored in the predetermined register of the NVRAM 33 by the MPU 31 (S11).

After the storage of the adjusting and setting values in the NVRAM 33, the adjusting value storage card A is ejected out of the passbook printer 1 (S12), completing a series of maintenance operations.

If it is confirmed in S7 that the adjusting and setting values have been changed from the initial values, but the changed adjusting and setting values have not been stored in the adjusting value storage card, then the downloading described in the embodiment is carried out.

First, an adjusting value storage card C is inserted into the passbook printer 1 (S13). This adjusting value storage card C is different from the adjusting value storage cards A and B in that nothing is stored in the DATA portion thereof.

When the adjusting value storage card C is inserted, the MPU 31 of the control card 3 reads the adjusting and setting values from the NVRAM 33 (S14).

The read adjusting and setting values are written in the inserted adjusting value storage card C by the magnetic head 41 of the magnetic reading/writing unit 4 (S15). The adjusting value storage card C must be kept inserted into the passbook printer 1. The adjusting value storage card C may be temporarily ejected out of the passbook printer 1. In this case, however, it is necessary to reinsert the adjusting value storage card C into the passbook printer 1.

After the writing of the adjusting and setting values in the adjusting value storage card C, the control card 3 is replaced, and a new control card 3 is installed (S16).

When the adjusting value storage card B is inserted into the passbook printer 1, the magnetic head 41 of the magnetic reading/writing unit 4 reads the adjusting and setting values from the adjusting value storage card C (S17).

The read adjusting and setting values are, as described above, stored in the predetermined register of the NVRAM 33 by the MPU 31 (S18).

After the storage of the adjusting and setting values in the NVRAM 33, the adjusting value storage card C is ejected out of the passbook printer 1 (S19), completing a series of maintenance operations.

Figure 8:
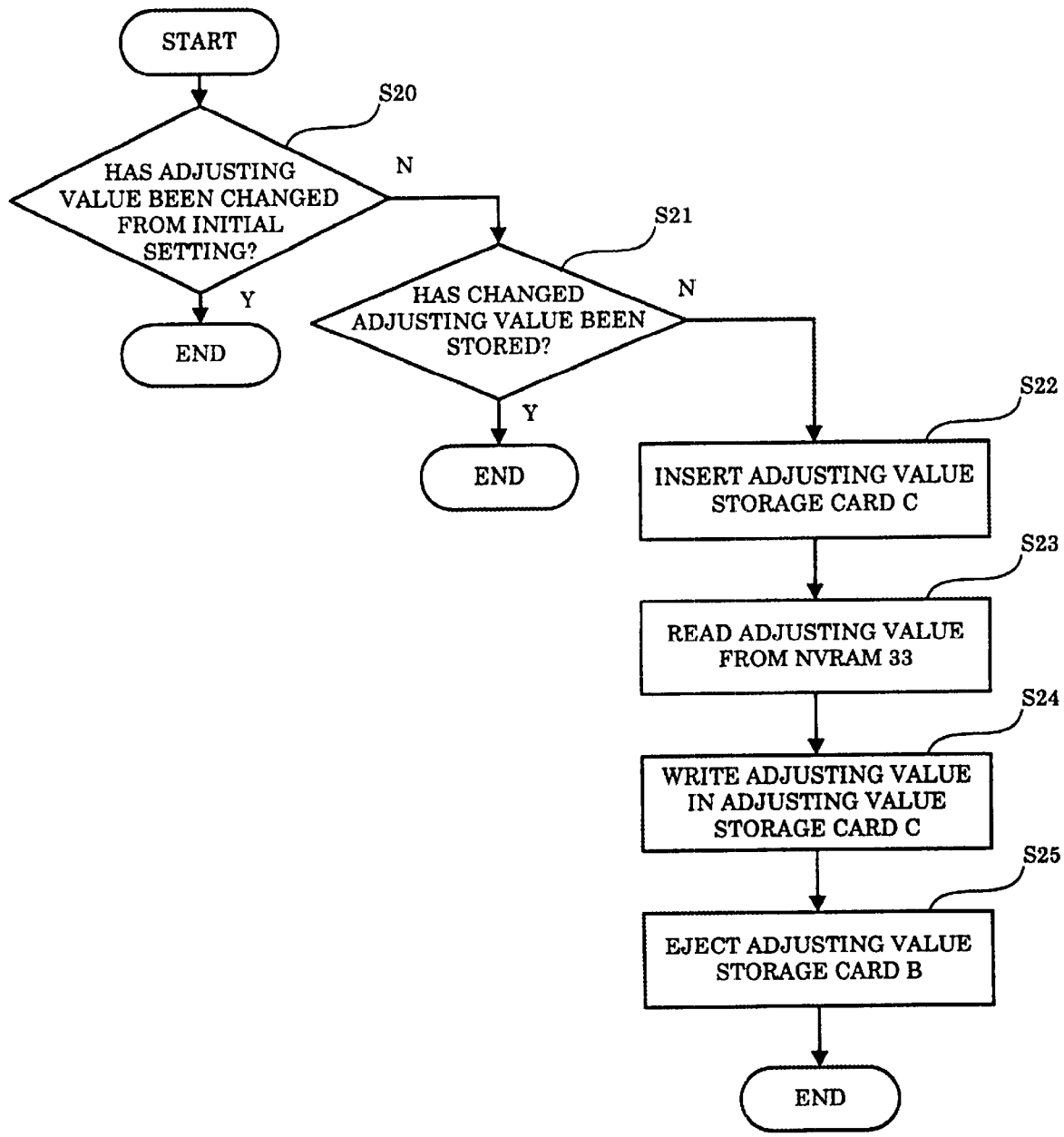
FIG. 8 is a chart showing a maintenance flow of the passbook printer of the embodiment.

For the maintenance work described above with reference to FIGS. 6 and 7, the control card 3 must be replaced as a precondition. However, the downloading described in the embodiment can be singly carried out during maintenance work necessitating no replacement of the control card 3. Such maintenance work is shown by the flow chart of FIG. 8.

First, determination is made as to whether the adjusting and setting values have been maintained at their initial values or not (S20). If they are maintained at the initial values, the processing is finished.

If it is determined that the adjusting and setting values have been changed from the initial values, then determination is made as to whether the changed adjusting and setting values have already been stored in the adjusting value storage card or not (S21). If the changed adjusting and setting values have already been stored in the adjusting value storage card, then processing is finished.

If it is determined that the changed adjusting and setting values have not been stored in the adjusting value storage card, then the adjusting value storage card C is inserted into the passbook printer 1 (S22).

After the insertion of the adjusting value storage card C, the MPU 31 of the control card 3 reads the adjusting and setting values from the NVRAM 33 (S23), and writes the read adjusting and setting values in the inserted adjusting value storage card C (S24). Then, the adjusting value storage card C is ejected (S25), completing the processing.

In the foregoing maintenance work, the determination as to whether the adjusting and setting values are maintained at the initial values without any changes (S1), and the determination as to whether the storage of the changed adjusting and setting values in the adjusting value storage card (S7) is finished can be carried out by the following procedures.

One procedure is a method of determination based on a maintenance work record. Usually, when maintenance work is carried out, a maintenance engineer writes down the content of the maintenance in a maintenance work record book or the like. By including changed adjusting and setting values if any in the recorded items, then the foregoing determination can be made by referring to these items. If there have been changes in the adjusting and setting values from their initial values, data regarding the adjusting and setting values after the changes in the adjusting value storage card may be included in the recorded items. In this way, based on such recorded items, it is possible to determine whether the adjusting and setting values have been maintained at the initial values without any changes or not, and whether the changed adjusting and setting values have already been stored in the adjusting value storage card or not.

The described procedure is a determination method based on the maintenance record kept by the maintenance engineer. A similar function can be provided in the passbook printer 1 itself. In other words, the history of changed adjusting and setting values and the history of downloading are stored in the NVRAM 33 of the control card 3, and data regarding these histories can be displayed on the operation panel 6.

For example, a command for displaying the history of changes on the operation panel 6 is set at 32. A display on the operation panel 6 in the case where the adjusting and setting values at the initial values are maintained without any changes is set at 51, a display in the case of the finished storage of the adjusting and setting values changed from the initial values in the adjusting value storage card 7 is set at 52, and a display in the case of non-storage of the adjusting and setting values changes from the initial values is set at 53. In addition, a control code is set in the ROM 32 to execute any one of displays 51 to 53 by referring to the history of changes and downloading of the NVRAM 33 when the MPU 31 of the control card 3 receives the command 32. Then, the maintenance engineer enters the command 32 from the operation panel 6 before the control card 3 is replaced, and thereby the MPU 31 determines whether the adjusting and setting values have been maintained at the initial values or not, whether the changed adjusting and setting values have already been stored in the adjusting value storage card or not, and displays the result of such determination on the operation panel 6. The maintenance engineer can carry on maintenance work thereafter according to the display. In addition to displaying on the operation panel 6, if it is determined that there have been changes in the adjusting and setting values from the initial values, the MPU 31 can instruct the writing of the changed adjusting and setting values in the adjusting value storage card 7. In this case, the ROM 32 is provided with control codes corresponding to such instructions.

Figure 9:
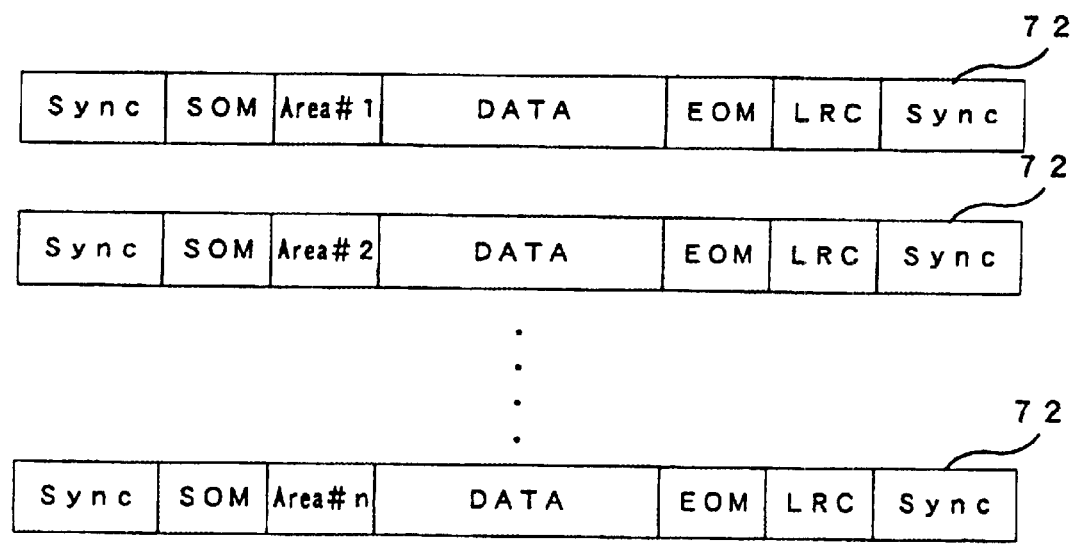
FIG. 9 is a view showing an example of a format of the magnetic stripe 72 of the embodiment.

As described above, the magnetic stripe 72 of the adjusting value storage card 7 has a format compatible to industry standard. However, there should be no limitation placed in this regard. If a self-diagnosis operation mode can be set for the passbook printer 1 by using the printer 1 off-line, a format of its own can be employed. For example, as shown in FIG. 9, a format can be set in a manner that a plurality of magnetic stripes 72 are prepared, Area # code is decided as a header for magnetic stripe 72, and then adjusting and setting values thereafter are stored in the DATA portion. In this way, it is possible to increase the number of setting and adjusting values to be set.

The embodiment has been described regarding the passbook printer employing the magnetic recording system. As described above, however, the application of the invention is not limited to the passbook printer.

As apparent from the foregoing, according to the present invention, the burden of resetting adjusting and setting values of the passbook printer can be greatly reduced. Although the preferred embodiments of the present invention have been described in detail, it should be understood that various changes, substitutions and alternations can be made therein without departing from the spirit and scope of the appended claims.

What is claimed is:

1. A passbook printer for performing printing on a passbook having a beltlike magnetic recording layer provided therein, comprising:
   a memory for storing operation control data used to control an operation of the passbook printer;
   a magnetic head for executing reading of data from, or writing of data in the beltlike magnetic recording layer provided in the passbook based on the stored operational data;
   a control unit for instructing the magnetic head to read the operation control data from a magnetic recording medium on the passport to update data in the passport; and
   controls in the passport printer for differentiating between the data read by the magnetic head from the magnetic recording layer of the passbook and control data read from a magnetic medium on an external storage unit, to store the read operation control data from the magnetic medium in the memory, when the saving magnetic recording medium storing the operation control data is received through said magnetic head from the external unit.

2. The passbook printer according to claim 1, comprising:
   operation control data change displaying means for displaying a change of the operation control data from initial setting.

3. The passport printer of claim 1, wherein said control unit is on a removable control card.

4. The passport printer of claim 3, wherein said removable control card contains the memory in the form of a non-volatile random access memory, and also contains a processing unit, a read only memory and an interface to the magnetic head.

5. The passport printer of claim 4, wherein said read only memory contains control code of the control unit for executing reading and writing of data from the memory.

6. The passbook printer according to claim 5, wherein said control unit makes determination as to whether the operation control data stored in the memory has already been stored in the saving magnetic recording medium.

7. A passbook printer for performing printing on a passbook having a beltlike magnetic recording layer provided therein, comprising:

a magnetic head for reading of data from and alternatively writing of data in the beltlike magnetic recording layer provided in the passbook;

a memory for storing operation control data used to control an operation of the passbook printer in reading and writing data during a passport transaction; and a control unit for instructing the magnetic head to perform a non-passport transaction which writes the operation control data stored in the memory in a saving magnetic recording medium on an external unit positioned for reading and writing by the magnetic head.

8. The passbook printer according to claim 7, wherein said control unit makes determination as to whether the operation control data stored in the memory has been changed from initial setting, and when determining a change, instructs writing of the operation control data stored in the memory in the saving magnetic recording medium.

9. The passbook printer according to claim 7, wherein said writing of the operation control data in the saving magnetic recording medium is performed while the saving magnetic recording medium is arranged in a position for executing reading/writing of the data on the passbook.

10. The passport printer of claim 9, wherein said control unit is on a removable control card.

11. The passport printer of claim 10, wherein said removable control card contains the memory in the form of a non-volatile random access memory, and also contains a processing unit, a read only memory and an interface to the magnetic head.

12. The passport printer of claim 11 wherein said read only memory contains control code of the control unit for executing reading and writing of data from the memory.

13. A maintenance method of a passbook printer provided with a memory for storing printer operation control data used to control an operation of the printer, and a reading/writing unit for reading/writing data in an data storage medium provided in a passbook, comprising:

a memory installing step of replacing the memory to install a new memory; and a printer operation control data storing step of causing the reading/writing unit to read the printer operation control data from an external data storage medium storing the printer operation control data, and to store the read printer operation control data in the new memory.

14. The maintenance method of a passbook printer according to claim 13, comprising, before the storing means installing step, a printer operation control data confirming step of making confirmation as to whether the printer operation control data has been changed from initial printer operation control data.

15. The maintenance method of a passbook printer according to claim 14, wherein if it is confirmed in the printer operation control data confirming step that the printer operation control data has not been changed from the initial data, then in the printer control data storing step, the printer operation control data is read from the external data storage medium storing the initial printer operation control data beforehand.

16. The maintenance method of a passbook printer according to claim 15, wherein if it is conformed in the printer operation control data confirming step that the printer operation control data has been changed from the initial data, then, after the printer operation control data confirming step, a printer operation control data stored in the memory in the external data storage medium is executed, and in the printer operation control data storing step, the printer operation control data is read from the external data storage medium having the printer operation control data written therein in the printer operation control data writing step.

17. The maintenance method of claim 16 including using a read only memory associated with the new memory containing control code for executing reading and writing of data from the new memory to perform the steps of claim 16.

18. The maintenance method of claim 17 including having the memory and read only memory on a common replacement card.

* * * * *